FEEDBACK APPARATUS

Filed July 27, 1966

INVENTOR.
ROBERT J. GODLOVE
HENRY P. KARWAN
BY
Christie, Parker & Hale
ATTORNEYS.

FEEDBACK APPARATUS

INVENTOR.
ROBERT J. GODLOVE
HENRY P. KARWAN

Christie, Parker & Hale
ATTORNEYS

FEEDBACK APPARATUS

INVENTOR.
ROBERT J. GODLOVE
HENRY P. KARWAN
Christie, Parker & Hale
ATTORNEYS

INVENTOR.
ROBERT J. GODLOVE
HENRY P. KARWAN
Christie, Parker & Hale
ATTORNEYS

United States Patent Office 3,400,615
Patented Sept. 10, 1968

3,400,615
FEEDBACK APPARATUS

Robert J. Godlove, Hacienda Heights, and Henry P. Karwan, Pomona, Calif., assignors to Digital Systems, Inc., Covina, Calif., a corporation of California Filed July 27, 1966, Ser. No. 568,235
16 Claims. (Cl. 77—32.2)

This invention relates to the art of workpiece fabrication and has a particularly valuable application for use in printed circuit board drilling operations.

In the production of printed circuit boards the practice has heretofore include the use of a circuit board drilling machine having a plurality of drill spindles carried by a vertically movable drill bar. The printed circuit boards to be drilled are placed on tooling pins on a drill table beneath the drill spindles. Typically, the table is mounted to move in both an "X" and "Y" direction for proper positioning of the circuit boards with respect to the drills secured in the drill spindles. Two tables may be used with one carried by the other and each table capable of one coordinate travel. "X" and "Y" positions are determined by a program which is sensed by a controller with the information being sent to table positioning motors. The drill spindles are lowered and their drills presented to the circuit boards to be drilled upon command from the controller.

The drilling program is produced with the aid of artwork descriptive of the drill pattern desired. The artwork is positioned on a table and optically scanned. During the scanning process, the tape is programmed with the data required to position the workpieces to be drilled with respect to the drills and other information necessary to command drilling machine functions during the fabrication process. Alternately, a tape can be programmed by dialing the "X" and "Y" coordinates of each hole location which moves the drilling machine's table to the proper location whereupon the tape is punched with the "X" and "Y" information.

Circuit board drilling systems of the type described are capable of accurate hole fabrication at a rapid rate. However, drilling errors arising from reading errors, noise, and operator error often occur. Noise errors are produced from line or electrical noise which randomly sets data registers in the controller causing spurious signals and drilling errors. Reading errors occur when the tape reader drops or adds information (bits) to the program. Operator error results from such mistakes as dialing in the wrong information for the program. One such error which results in the drilling of a circuit board in the wrong location can ruin an otherwise perfect board. Because of the number of boards which are drilled and their complexity, the cost of error may be substantial.

The instant invention overcomes the costly mistakes due to reading errors, noise, or operator error and is capable of use with existing program controllers and drilling machines. The instant invention is used in combination with a drilling machine, such as a circuit board drilling machine, having a table capable of two coordinate travel for mounting workpieces to be drilled. The drilling machine has at least one drill for drilling a workpiece mounted on the table as well as means for positioning the table and its carried workpieces, means for operating the drill and a platform for a master. The master has a pattern descriptive of the drill pattern desired in the workpiece. A program controller is employed which generates a position signal which is used to position the table with respect to the drills. The feedback apparatus of the invention includes a frame which is carried by the table. The frame follows the movement of the table over the master located on the platform such that the position of the workpiece with respect to the drill corresponds to that of the frame with respect to the master. Means are carried by he frame for sensing the master and determining whether the position of the workpiece with respect to the drill is correct. The sensing means is operative to command the drilling machine to fabricate a hole in the workpiece upon the determination of a correct drilling position.

In one preferred form, the instant invention uses a master having a drill hole pattern corresponding to the pattern desired in the finished workpiece. The program controller includes means for generating a drill signal. The sensing means includes a pin which is inserted into a drill hole in the master in response to the drill signal from the program controller. If the pin enters the drill hole, the means commands the drilling machine to fabricate a hole in the workpiece. If the pin does not enter the drill hole, then an error is present which must be corrected before drilling the workpiece. Preferably, means are provided to prevent movement of the drilling machine table when the pin does not withdraw from the drill hole in the master. This feature prevents the shearing of the pin and damage to the master when the pin is prevented from withdrawing because of a misalignment between it and the drill hole.

The advantages of the instant feedback apparatus and circuit include the provision of an inexpensive, rugged and simple means for the elimination of noise, operator and reading errors which have heretofore plagued the circuit board fabrication industry. Elimination of these errors results in increased production and a decrease in quality control time as well as the substantial costs occasioned by drilling error.

These and other features, aspects and advantages of the instant invention will become more apparent from the following description, appended claims and drawings, in which:

Figure 1:
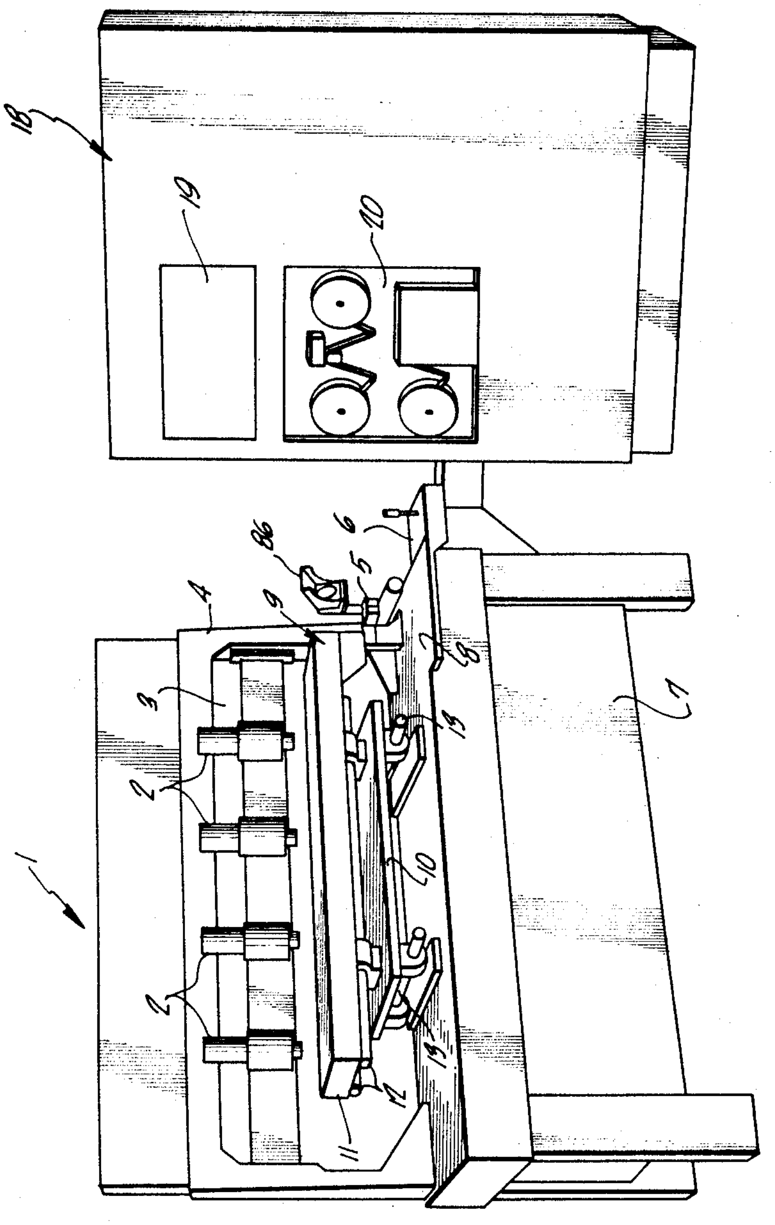
FIGURE 1 is a perspective view of a printed circuit board drilling apparatus heretofore used adapted with the inventive feedback apparatus.

Referring now to FIGURE 1, there is shown a circuit board drilling machine 1. A drill bar 3 is reciprocally mounted in overhead assembly 4 to allow the vertical positioning of the attached drill spindle assemblies 2 with respect to the "X" and "Y" positioning tables 9. The drill spindle assemblies 2 receive the drills used for drilling the printed circuit secured in place by tooling pins on table 11. Table 11 as well as table 10 comprise the coordinate positioning table 9 and are mounted on base 7 of circuit board drilling machine 1. Table 10 is movable in the horizontal plane in the direction corresponding to the "Y" axis of the circuit boards to be drilled. This movement is typically accomplished through lead screws 13 which are powered by an electrical motor (not shown). Table 10 carries a second table 11 which is movable along the "X" axis through "X" lead screws 12 driven by a motor (not shown). The desired coordinates of the printed circuit boards are then achieved by the proper positioning of "Y" table 10 and "X" table 11. Platform 8 is adapted to receive a master which is descriptive of the drill pattern in the workpieces.

Secured to the "X" table 11 is the feedback control assembly 5 of the instant invention. The movement of assembly 5 relative to a master located on platform 8 is, therefore, determined by the movement of the "X" and "Y" tables. Assembly 5 includes an optical comparator 86 for aiding in the establishment of a program for controller 18. Positioning of the tables 9 is accomplished through information provided by program controller 18 which has a control panel 19 and a tape punch and tape reader 20. Alternately, table 9 can be positioned through joy stick control 6.

To establish a program for the program controller 18, artwork descriptive of the drill pattern desired is placed on platform 8 beneath the feedback assembly 5 and optical comparator 86. The optical comparator 86 then scans the art work through operation of joy stick control 6 and the corresponding "X" and "Y" movement of tables 9. When a drill hole location is found, the tape is punched with the required coordinate information. Other required information for the operation of the circuit board drilling machine is, of course, programmed into the tape. This information is produced, stored and used by any of a number of well-known methods.

After completion of the program, an undrilled master circuit board is positioned on table 11 on tooling pins (not shown). The drilling machine 1 is then allowed to operate in accordance with the program read by program controller 18. This produces a drilled master circuit board having the desired drill pattern which is normally inspected to avoid error. The master circuit board is then positioned on platform 8 on tooling pins (not shown). This position is 180° from the position of the workpieces to be drilled in order to compensate for dimensional inversion produced through the carrying of the feedback assembly 5 by the tables 9. Preferably, the master is then checked by allowing the drilling machine to once again go through the program and observing the hole locations in the master through the optical comparator 86. The master is then ready to perform its function in the feedback control apparatus and circuit to be described.

Figures 2, 5:
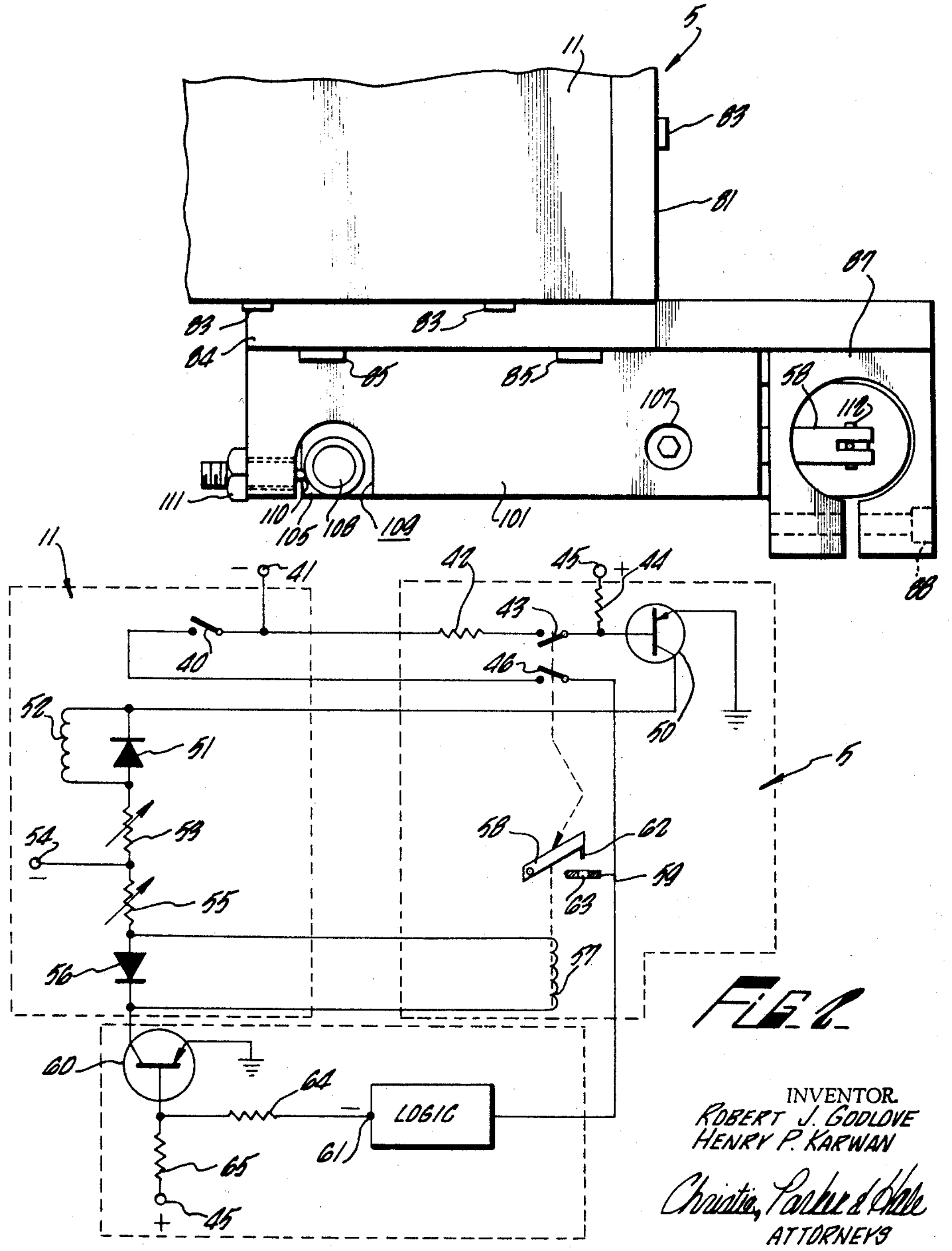
FIGURE 2 is a schematic depiction of the preferred feedback circuit of the apparatus of the instant invention.
FIGURE 5 is a top plan view of the apparatus shown in FIGURE 3.

FIGURE 2 is a schematic view of the preferred circuitry for the feedback control of the instant invention. This circuitry is used in conjunction with a master template 59 having a predrilled hole pattern corresponding to the hole pattern desired in the finished workpieces. The master, inverted 180°, is positioned on the platform 8 of drilling machine 1 with one of its holes, hole 63, in position below feedback assembly 5. The feedback apparatus 5, which is carried by table 11, includes a solenoid operated lever 58 having a pin 62 adapted for insertion into hole 63.

The solenoid which operates lever 58 is shown schematically at 57. Solenoid 57 is actuated by power source 54 when transistor 60 becomes conductive; a condition achieved when a drill signal in the form of a negative potential at terminal 61 exists which acts through on bias resistor 64 to the base of the transistor 60. The drill signal to terminal 61 is produced in the logic portion of the controller 18. Through its collector and emitter, transistor 60 is connected in a series circuit between power source 54 and ground. Current leakage through transistor 60 is prevented by a positive off bias 45 acting through off bias resistor 65 to its base. Variable resistor 55 is in series with feedback solenoid 57 for adjustment of current while transient prevention diode 56 is connected in parallel with solenoid 57 to arrest transients produced when transistor 60 becomes nonconductive upon termination of the drill signal from logic.

When the drill signal from logic actuates transistor 60, the solenoid 57 energizes and pin 62 of lever 58 is thrust downward for insertion into hole 63 in master 59. Feedback switch 43 is controlled by this action and closes when pin 62 enters hole 63 actuating the circuit which controls the drill down solenoid 52. Typically, drill down solenoid 52 actuates a pneumatic valve which lowers the drill bar 3 and the spindle assemblies 2 to drill the circuit boards mounted on table 11. The circuit energized by the closing of feedback switch 43 includes transistor 50, drill down solenoid 52, and on bias potential 41. On bias potential 41 through on bias resistor 42 and closed feedback switch 43 determines the conductivity of transistor 50 by the control of the potential on its base. The collector of transistor 50 is in series with drill down solenoid 52 and, through variable resistor 53, with power supply 54. The emitter of transistor 50 is connected to ground. When feedback switch 43 is open, leakage through transistor 50 is eliminated through the provision of off bias potential 45 connected in series with off bias resistor 44 and the base of the transistor 50. Transient suppression diode 51 is connected in parallel with the drill down solenoid 52 for the prevention of transients produced by the solenoid upon the opening of feedback switch 43. Thus, control of the drilling of circuit boards mounted on table 11 of drilling machine 1 is a function of the position of feedback switch 43. When feedback switch 43 is closed, transistor 50 becomes conductive and drill down solenoid 52 is energized. Transistor 50, however, cannot be actuated until switch 43 is closed which in turn is a function of the position of lever 58 determined by pin 62 finding hole 63 in master 59. A positive feedback control is then achieved.

In preferred form, means are provided to prevent the movement of the drill tables 9 if pin 62 happens to stick in hole 63; that is, when lever 58 does not withdraw pin 62 from the master 59 upon the cessation of current flow through feedback solenoid 57. These means include a normally closed interlock switch 46 which upon the insertion of pin 62 in the master 59 opens preventing the logic from dictating movement of the drill table 11. Upon the withdrawal of pin 62 from the master 59, interlock switch 46 closes and the logic is allowed to dictate a new position for the table 11. Interlock switch 46 is connected in series with negative bias potential 41 which, when felt by logic, allows the new position dictation. Drill bar up switch 40 is closed by the drill bar as it approaches its down position. This switch is in circuit with the logic in controller 18 to enable it to dictate new commands which are appropriate when the drill bar is down. This portion of the circuitry has been omitted for the purpose of clarity inasmuch as it is well known in the art and forms no part of the instant invention.

Figure 3:
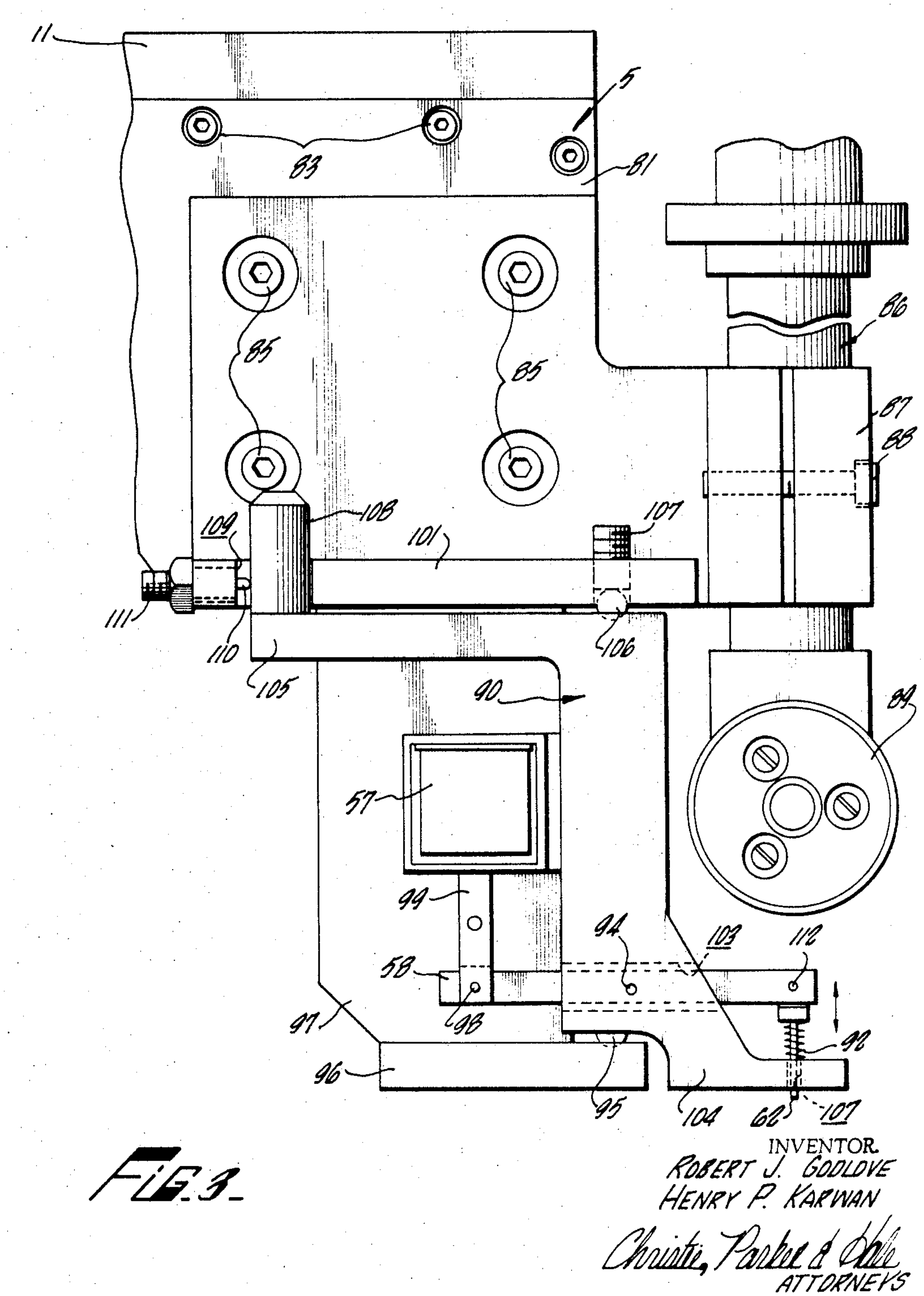
FIGURE 3 is an elevational view showing a preferred portion of the apparatus of the instant invention.
Figure 4:
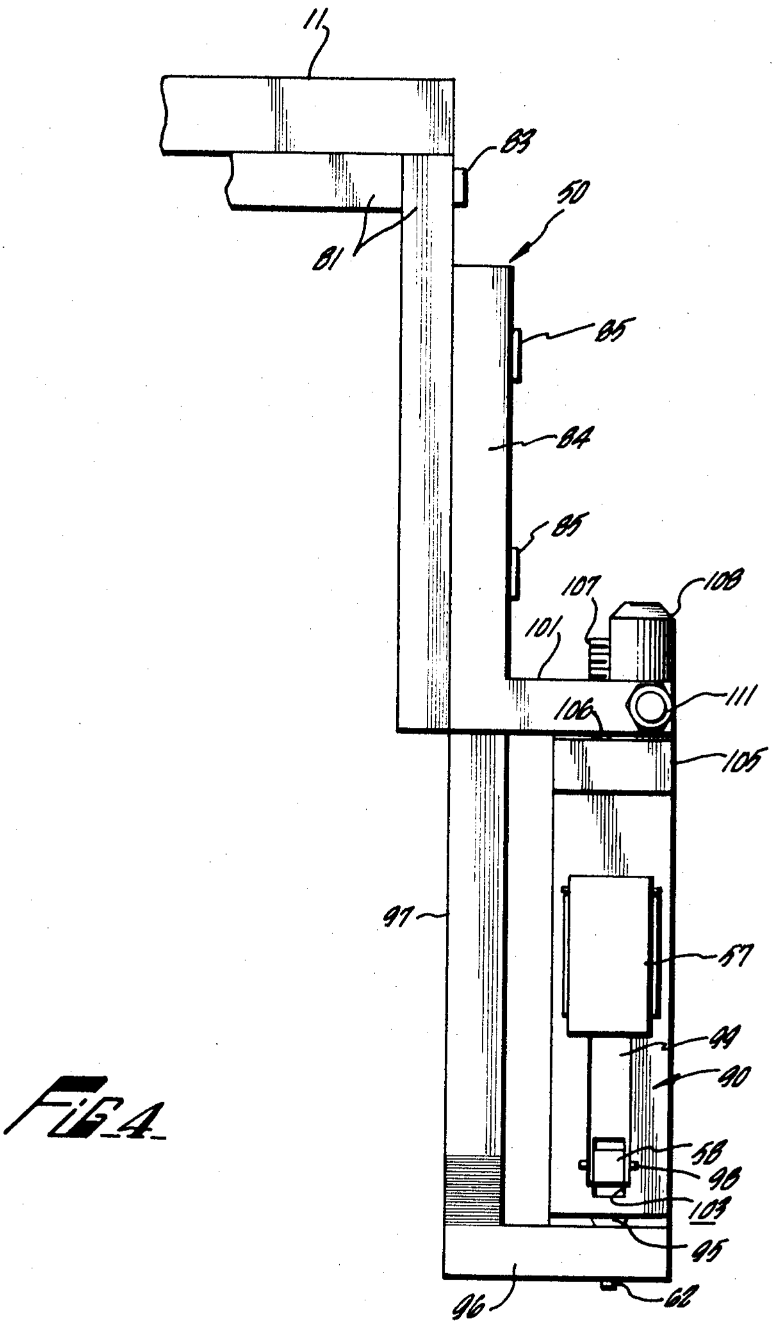
FIGURE 4 is a partial end elevation of the apparatus shown in FIGURE 3.

The mechanical portions of the feedback assembly 5 are better shown in FIGURES 3, 4, and 5 in which reference numeral 5 refers generally to the feedback assembly. This assembly is carried by table 11 and follows the position of tables 10 and 11 determined by a program read by program controller 18 as previously described. Mounting bracket 81 is secured to the table 11 ("X" table), preferably through a horizontal mounting plate, by fasteners 83. A second adjustable mounting bracket 84 is secured to bracket 81 through fasteners 85. This second mounting bracket 84 includes a clamp 87 for receiving and fixing optical comparator 86 in place. The comparator 86 is locked through provision of a fastener 88. The optical comparator, as is well-known in the art, includes a light source 89 to illuminate the field of scan. Mounting plate 84 also includes a horizontally projecting flange 101 having a recess 109 for receiving lug 108 of hinge member 90. Mounted on the flange 101 is locking pin 110 secured by locking pin adjustment screw 111. Depending from bracket 84 is web portion or section 97 having a horizontally disposed flange 96. Flange 96 is adapted to receive a ball 95 which functions with hinge member 90 as will be described. Hinge member 90 includes a midportion with two horizontally extending arms 105 and 104. The upper arm 105 is adapted to receive ball 106 which is secured through screw 107. Thus, hinge member 90 is pivotally secured to the remaining portions of the feedback assembly 5 through keepers 106 and 95 in form of spherical balls. At the far end of the arm 105 is the lug 108 which is adapted to be received in recess 109 and locked in place through locking pin 110. Carried by the hinge 90 is feedback solenoid 57 having an armature 99 pivotally connected to lever 58 by pivot pin 98. Lever 58 is pivotally secured to hinge member 90 at pivot point 94 in a horizontally disposed bore 103 in the hinge. Pin 62 is pivotally secured to arm 58 by pivot pin 112. Lever 58 is urged upward through biasing means in the form of a spring 92. The lower arm 104 of hinge 90 includes a bore 102 for receiving pin 62.

Hinge member 90 and its associated elements, solenoid 57, lever 58 and pin 62, are pivotally mounted in the apparatus 5 to allow it to be swung out of position when it is desired to use the optical comparator 86. This is necessary because the optical comparator 86 and the pin 62 must be co-axially disposed for performing their proper function relative to the artwork on the one hand and the master on the other. When feedback control is desired, the hinge member 90 is secured in place in recess 109 through pin 110.

The operation of feedback assembly and circuit of the instant invention will now be described in detail. Tape is programmed initially through the placement of artwork on platform 8 for scanning by optical comparator 86. The required coordinate positions are programmed into program controller 18 with the aid of movement of the tables 9 controlled by joy stick 6. At appropriate intervals, information is sent to controller 18 for programming the tape to be used in the drilling of the circuit boards. After a program is completed, a master circuit board is drilled by placing it on "X" table 11 below one of the drill spindles 2 in place on tooling pins (not shown). The master is then drilled in accordance to the program previously established. After drilling, the master is placed on platform 8 in 180 degree relation to the workpieces which will be placed on table 11. Hinge member 90 is locked in place in recess 109 through pin 110. The program is then initiated and the "X" and "Y" tables, 11 and 10 respectively, move in response to signals from tape. When the controller 18 sends out a drill signal through its logic in the form of a negative potential at terminal 61 to the base of transistor 60, feedback solenoid 57 is actuated by the completion of the circuit from power source 54 through the transistor 60. Upon the energization of feedback solenoid 57, lever 58 is depressed and its pin 62 enters hole 63 in master 59. When pin 62 enters the hole 63, feedback switch 43 closes and the circuit through transistor 50 is established actuating the drill down solenoid 52 by the power source 54 for the fabrication of holes in the workpieces on table 11. Upon the closing of feedback switch 43, interlock switch 46 opens preventing further movement of the table 11 until it once again closes. Interlock switch 46 will close when lever 58 and its pin 62 return to their unactuated position out of the hole 63 in master 59. When interlock switch 46 is closed, the controller 18 is allowed to dictate new commands to the drilling machine 1 through switch 40 which is closed when the drill bar lowers.

If pin 62 does not enter hole 63 in master 59, then an error has been found and must be corrected before holes will be fabricated in the workpieces. In this event, the feedback switch 43 remains open as does the circuit from power source 54 through drill down solenoid 52 despite the presence of a drill signal on the base of transistor 60 and the corresponding energization of feedback solenoid 57.

When pin 62 enters hole 63 in master 59 and the drill signal is no longer present, the pin 62 through spring 92 will try to leave the hole 63. However, if there is misalignment between the pin 62 and the hole 63 the pin will not return to its inactivated position. In this event, interlock switch 46, which was opened upon the insertion of the pin 62 in hole 63, will remain open preventing on bias supply 41 from being felt in the logic of controller 18. Without the on bias supply presenting a signal to the logic, further coordinate positioning of the tables 9 is impossible, thus avoiding the shearing of pin 62 and signaling some malfunction to the operator of the system.

While the instant invention has been described with reference to certain preferred embodiments, the following appended claims should not be limited in their scope and spirit thereto.

What is claimed is:

1. A feedback apparatus capable of use in the fabrication of holes in a workpiece in combination with a program controller and a drilling machine, the drilling machine having at least one drill, a table capable of two coordinate travel for mounting at least one workpiece to be drilled, means for positioning the table and the workpiece, means for operating the drill to drill a hole in the workpiece, and a platform for a master descriptive of the drill pattern desired; the program controller including means for generating a position signal to actuate the workpiece positioning means; the feedback apparatus comprising:

(a) a frame carried by the table mounted for movement with respect to the master on the platform to a position corresponding to the position of the workpiece with respect to the drill, which position is dictated by the position signal from the program controller; and (b) means carried by the frame for sensing the master and determining whether the position of the workpiece with respect to the drill is correct and for commanding the drilling machine to fabricate a hole in the workpiece after such means determines that such position is correct.

2. The feedback apparatus claimed in claim 1, wherein:

the master has a drill hole pattern descriptive of the drill pattern desired in the workpiece;

the program controller includes means for generating a drill signal; and the sensing means includes a pin for insertion into one of the drilled holes in the master, such insertion being responsive to the drill signal from the program controller, the sensing means also including means for commanding the drilling machine to fabricate a hole in the workpiece upon the insertion of the pin into such hole in the master.

3. The feedback apparatus claimed in claim 2, wherein the sensing means include a feedback solenoid having an armature cooperating with the pin to insert the latter into the drill hole in response to the drill signal from the program controller.

4. The feedback apparatus claimed in claim 3, wherein the sensing means include a normally open feedback switch in electrical communication with the drill operating means and operable to close upon the insertion of the pin in the hole in the master to allow the drill operating means to function.

5. The feedback apparatus claimed in claim 4, wherein the sensing means includes a transistor having a base, an emitter, and a collector, the transistor being in circuit with the feedback switch such that the drill operating means is actuated when the transistor becomes conductive through the closing of the feedback switch.

6. The feedback apparatus claimed in claim 5, wherein:

the drill operating means includes a solenoid operative to cause the drilling of a hole in the workpiece, the transistor and the feedback switch being in circuit with the drill operating solenoid; and including a bias potential for the base of the transistor, a bias resistor in circuit with the bias potential, and a power supply for the drill operating solenoid and the feedback solenoid.

7. The feedback apparatus claimed in claim 6, wherein:

the feedback switch and bias resistor are in series with and between the bias potential and the base of the transistor, the collector of the transistor is in series with the drill operating solenoid; and including an off bias potential and an off bias resistor connected to the base of the transistor, a first transient suppression diode in parallel with the drill operating solenoid, and a second transient suppression diode in parallel with the feedback solenoid.

8. The feedback apparatus claimed in claim 4, including a normally closed interlock switch in electrical communication with the workpiece positioning means in the controller and operative to open upon the insertion of the pin in the drill hole and operative to close upon the withdrawal of the pin from the drill hole and render inoperative the workpiece positioning means when the interlock switch is open.

9. The feedback apparatus claimed in claim 8, wherein:
the insertion means includes a transistor having a base, an emitter, and a collector, the transistor being in circuit with the feedback switch such that the drill operating means is actuated when the transistor becomes conductive through the closing of the feedback switch;
the drill operating means includes a solenoid operative to cause the drilling of a hole in the workpiece, the transistor and the feedback switch being in circuit with the drill operating solenoid; and including
a bias potential for the base of the transistor, a bias resistor in circuit with the bias potential, and a power supply for the drill operating solenoid and the feedback solenoid.

10. The feedback apparatus claimed in claim 9, wherein:
the feedback switch and bias resistor are in series with and between the bias potential and the base of the transistor, the collector of the transistor being in series with the drill operating solenoid; and including
an off bias potential and an off bias resistor connected to the base of the transistor, a first transient suppression diode in parallel with the drill operating solenoid, and a second transient suppression diode in parallel with the feedback solenoid.

11. The feedback apparatus claimed in claim 10, including:
a second transistor having a base, a collector, and an emitter in circuit with the feedback solenoid and the controller such that a drill signal from the controller makes the transistor conductive and the feedback solenoid is actuated; and
a normally open drill bar up switch in circuit with the interlock switch and operative to close when the drill bar approaches its down position to establish the circuit to the interlock switch.

12. The feedback apparatus claimed in claim 3, wherein the frame comprises:
a mounting bracket adapted to be attached to the table and having a clamp for receiving an optical comparator in position to allow the comparator to scan the master;
a hinge member rotatably mounted on the bracket and carrying the feedback solenoid and pin; and
locking means for locking the hinge member against rotation in position for the pin to be capable of insertion in the drill hole.

13. The feedback apparatus claimed in claim 5, wherein the frame comprises:
a mounting bracket adapted to be attached to the table and having a clamp for receiving an optical comparator in position to allow the comparator to scan the master;

a hinge member rotatably mounted on the bracket and carrying the feedback solenoid and pin;
a lever pivotally mounted on the hinge member and pivotally connected at its ends to the armature and the pin; and
locking means for locking the hinge member against rotation in position for the pin to be capable of insertion in the drill hole.

14. The feedback apparatus claimed in claim 7, wherein the frame comprises:
a mounting bracket adapted to be attached to the table and having a clamp for receiving an optical comparator in position to allow the comparator to scan the master;
a hinge member rotatably mounted on the bracket and carrying the feedback solenoid and pin;
a lever pivotally mounted on the hinge member and pivotally connected at its ends to the armature and the pin; and
locking means for locking the hinge member against rotation in position for the pin to be capable of insertion in the drill hole.

15. The feedback apparatus claimed in claim 9, wherein the frame comprises:
a mounting bracket adapted to be attached to the table and having a clamp for receiving an optical comparator in position to allow the comparator to scan the master;
a hinge member rotatably mounted on the bracket and carrying the feedback solenoid and pin; and
locking means for locking the hinge member against rotation in position for the pin to be capable of insertion in the drill hole.

16. The feedback apparatus claimed in claim 11, wherein the frame comprises:
a mounting bracket adapted to be attached to the table and having a clamp for receiving an optical comparator in position to allow the comparator to scan the master;
a hinge member having a vertical portion, an upper horizontal arm extending from the vertical portion at its upper end, a lower horizontal arm extending from the vertical portion below its lower end in the opposite direction from the upper horizontal arm and having a bore for receiving the pin, the hinge member being rotatably mounted to the bracket at the ends of the vertical section, the vertical portion carrying the feedback solenoid, and the pin being received in the bore in the lower horizontal arm;
locking means for locking the hinge member against rotation in position for the pin to be capable of insertion in the drill hole including a lug on the upper horizontal arm and a recess in the bracket, the lug being adapted to be removably secured in the recess; and
a lever pivotally mounted on the hinge member and pivotally connected at its ends to the armature and the pin.

References Cited

Publication: Leland-Gifford Printed Circuit Board Drilling Machine, Bulletin PCB–2, Leland-Gifford Machine Tools, Worcester, Mass., U.S.A., received in the U.S. Patent Office Aug. 28, 1962, copy available in Group 320, CLASS 234–89. (4 pages).

FRANCIS S. HUSAR, *Primary Examiner.*